United States Patent
Dou et al.

(10) Patent No.: US 8,025,713 B2
(45) Date of Patent: Sep. 27, 2011

(54) ADJUSTABLE GAS-LIQUID CENTRIFUGAL SEPARATOR AND SEPARATING METHOD

(75) Inventors: Jianwen Dou, Gansu (CN); Jinsong Wan, Gansu (CN); Ligang Zhang, Gansu (CN)

(73) Assignee: Haimo Technologies, Inc., Gansu (CN)

( * ) Notice: Subject to any disclaimer, the term of this patent is extended or adjusted under 35 U.S.C. 154(b) by 952 days.

(21) Appl. No.: 10/557,114

(22) PCT Filed: May 16, 2003

(86) PCT No.: PCT/CN03/00360
§ 371 (c)(1),
(2), (4) Date: Nov. 13, 2006

(87) PCT Pub. No.: WO2004/101161
PCT Pub. Date: Nov. 25, 2004

(65) Prior Publication Data
US 2007/0084340 A1    Apr. 19, 2007

(51) Int. Cl.
*B01D 45/12* (2006.01)
(52) U.S. Cl. .......... 95/8; 95/261; 95/269; 55/459.3; 96/208; 96/216; 96/413
(58) Field of Classification Search .......... 55/337, 55/459.3, 459.5; 96/208, 216, 413; 95/8, 95/12, 261, 269
See application file for complete search history.

(56) References Cited

U.S. PATENT DOCUMENTS

| | | | |
|---|---|---|---|
| 3,481,118 A | 12/1969 | Swann et al. | |
| 4,278,550 A * | 7/1981 | Watts | 210/741 |
| 4,414,112 A | 11/1983 | Simpson et al. | |
| 4,424,068 A | 1/1984 | McMillan | |
| 4,852,395 A | 8/1989 | Kolpak | |
| 4,857,197 A | 8/1989 | Young et al. | |
| 4,881,412 A | 11/1989 | Northedge | |
| 4,948,396 A * | 8/1990 | Barnes et al. | 95/219 |
| 5,218,840 A | 6/1993 | Kolpak | |
| 5,252,229 A | 10/1993 | Rojey et al. | |

(Continued)

FOREIGN PATENT DOCUMENTS

CN     1072609 Y     6/1993

(Continued)

OTHER PUBLICATIONS

Supplementary European Search Report for EP 03 73 2174 dated Jan. 12, 2009.

(Continued)

*Primary Examiner* — Robert A Hopkins
(74) *Attorney, Agent, or Firm* — Knobbe Martens Olson & Bear LLP

(57) ABSTRACT

An adjustable type guide vortex gas-liquid separating apparatus is provided, it comprises a case, a vortex flow guide spiral pipe, a mist eliminator, an adjusting valve and a γ ray phase volume fraction meter. Its separating method is to make the oil-gas-water multiphase flow move in vortex, and thus to realize the gas-liquid separation, then to measure the gas content of the separated liquid phase by using the γ ray phase volume fraction meter and to send out control information as judged by the magnitude of the gas content in the liquid phase, so as to control the opening of the adjusting valve of the gas circuit, thus to achieve adjustment of the gas-liquid separation effects, and to control the gas content of the liquid phase to a certain range.

8 Claims, 2 Drawing Sheets

U.S. PATENT DOCUMENTS

| | | | |
|---|---|---|---|
| 5,390,547 A | 2/1995 | Liu | |
| 5,565,101 A | 10/1996 | Kuntz | |
| 5,866,000 A | 2/1999 | Yeh | |
| 6,190,543 B1 | 2/2001 | Christiansen | |
| 6,209,388 B1 * | 4/2001 | Letton et al. | 73/61.79 |
| 7,638,062 B2 | 12/2009 | Movafaghian et al. | |
| 7,708,146 B2 | 5/2010 | Kruyer | |
| 2010/0006488 A1 | 1/2010 | Folkvang | |

FOREIGN PATENT DOCUMENTS

| | | |
|---|---|---|
| CN | 1130235 A | 4/1996 |
| CN | 1182873 A | 5/1998 |
| CN | 2293799 Y | 10/1998 |
| CN | 2325761 Y | 6/1999 |
| CN | 2348358 Y | 11/1999 |
| CN | 2455329 Y | 10/2001 |
| CN | 2458523 Y | 11/2001 |
| CN | 2537960 Y | 2/2003 |
| DE | 199 26 388 A1 | 12/2000 |
| EP | 0383585 A | 8/1990 |
| EP | 1 666 153 B1 | 7/2010 |
| FR | 2219672 A | 10/1974 |
| WO | WO 89/02066 A | 3/1989 |

OTHER PUBLICATIONS

European Office Action for 03 732 174.2, dated May 11, 2009.
Decision to grant European Patent No. 1666153, dated Jul. 1, 2010.

* cited by examiner

ADJUSTABLE GAS-LIQUID CENTRIFUGAL SEPARATOR AND SEPARATING METHOD

FIELD OF THE INVENTION

The invention relates to a gas-liquid on-line separating apparatus and method, and in particular, to an apparatus and method adapted for gas-liquid on-line separating an oil-gas-water multi-phase flow of oil field.

DESCRIPTION OF THE PRIOR ART

At present, a conventional separating and metering method is mostly used to meter the productions of oil wells, that is, the products of oil wells are delivered into a metering separator, where they are separated into three single-phase fluids of oil, gas and water, and then each single-phase fluid is metered to obtain respective production of oil, gas and water, but such system is huge, the separator and its related accessories have tens of tons in weight and occupy an area in several hundreds of square meters, to make the maintenance and management quite complex and miscellaneous. In recent years an oil-gas-water multi-phase flow rate measuring apparatus is disclosed and can measure the flow rate of each phase of oil, gas and water without necessity for separating oil, gas and water of oil wells, it has changed the conventional separating and metering manner still used at present. This apparatus is light in weight and small in volume, and generally has 0.5-2 ton in weight and occupies about 2 m² in area, so that the investment in the well measurement is reduced, and the on-line, continuous and automatic measurement control of a single well is realized.

However, since the oil-gas-water multi-phase flow in the pipe is an extreme complex random process having multi-variables, various flow states, such as bubble flow, circular flow, layered flow, interrupted flow and etc., different phase components, such as high gas content, low gas content, high water content, low water content and etc.; and their different random and irregular combinations make the multiphase flow rate measuring technology have a great limitation, and in particular, it can not be adapted to the measurement for the oil wells having high gas content. Thus, to a great extent, the extension and use of the multiphase flow rate measuring apparatus in the production practice is limited.

SUMMARY OF THE INVENTION

In order to solve this difficult problem, the invention makes efforts to research how to lower the gas content in the multiphase flow rate measurement, and a first object of the present invention is to provide an adjustable type separating apparatus mounted to an oil line and having a small volume and light weight to unify and simplify the various complex flow patterns of the oil-gas-water multi-phase flow and at the same time to lower the gas content to a certain range to which the multiphase flow rate measuring apparatus can be adapted.

A second object of the present invention is to provide a method for changing flow patterns of the oil-gas-water multiphase flow and lowering the gas content to be realized.

In order to achieve the first object, the invention is to provide an adjustable type guide vortex gas-liquid separating apparatus, which comprises an adjusting valve, a flange cover, a case comprising a cylinder and a conical barrel, the cone section of the case is provided with a level meter or a liquid circuit exit is associated with a γ ray phase volume fraction meter; inside the case there are provided with a mist eliminator, and meantime with a gas discharge pipe as well as an oil-gas-water multi-phase flow vortex guide spiral pipe. The case is configured in such a way that the gas discharge pipe is mounted in the middle of the vortex flow guide spiral pipe, the inlet of the oil-gas-water multi-phase flow vortex guide spiral pipe is connected with a case inlet flange pipe section, the lower tail end of the case is connected with a pipe section and a flange, and in turn is associated with the γ ray phase volume fraction meter through the flange, and a gas throughflow pipe is mounted in the center of the case. A part of gas separated from the oil-gas-water multiphase flow is discharged from the tail end liquid circuit exit of the case, and through the liquid exit flange enters the γ ray phase volume fraction meter to measure the gas content. The separated gas, which has been eliminated from mist by the mist eliminator and does not contain any liquid, is discharged through the gas circuit adjusting valve, and enters the gas circuit. The gas circuit adjusting valve is used to control the gas flow rate of the gas circuit, so that the gas content of the discharged oil-gas-water multi-phase flow is adjusted to a certain range, so as to meet the requirements for the gas content measuring range of the oil-gas-water multiphase flow rate measuring apparatus.

The level meter is used to monitor the height of the liquid level in the vortex cone, and at the same time provides for the adjusting valve a control information.

The γ ray phase volume fraction meter is used to measure the gas content of the fluid discharged from the liquid circuit of the separating apparatus, and provides for the adjusting valve a control information. One of the level meter and the γ ray phase volume fraction meter can be selected or both may be adopted simultaneously, when being mounted.

The adjustable type guide vortex gas-liquid separating apparatus of the invention, because a guide vortex method is used, has a separator having small volume (<1 m²), a light weight (<1 ton) and a high separation efficiency.

The adjustable type guide vortex gas-liquid separating apparatus of the invention is mounted and adjusted conveniently, and can change the flow patterns and flow states of the original oil-gas-water multi-phase flow to simplify and unify varieties of complex flow patterns and states.

In order to achieve the second object, the invention is to provide a method for changing flow patterns and flow states of the oil-gas-water multiphase flow and lowering the gas content to meet the different requirements for measurement of the oil-gas-water multi-phase flow rate measuring apparatus.

The method comprises the following steps:
1) Limiting the sectional area of the inlet of the vortex flow guide spiral pipe to make the flow velocity of the oil-gas-water multi-phase flow passed into the vortex flow guide spiral pipe reach a certain range;
2) Making the oil-gas-water multi-phase flow move in vortex under the guidance of the vortex flow guide spiral pipe;
3) Separating the gas and liquid in the vortex motion;
4) Removing the liquid contained in the separated gas by the mist eliminator and discharging the gas from the gas circuit;
5) Collecting the liquid removed from the gas by the mist eliminator into the multi-phase flow, the gas content of which has been lowered through gas-liquid separation;
6) Measuring the gas content of the oil-gas-water multi-phase flow with lowered gas content or measuring the height of the liquid level; and
7) Providing control information to the control system as judged by the liquid level or the magnitude of the gas content to adjust the opening of the gas circuit valve, control the magnitude of the gas flow rate of the gas circuit, make the gas circuit not contain any liquid and lower the gas content of the multiphase flow discharged from the liquid circuit to a certain range.

DETAILED DESCRIPTION OF THE PREFERRED EMBODIMENT

Hereinafter, the embodiments of the invention are described in detail with reference to the appended drawings.

Figure 1:
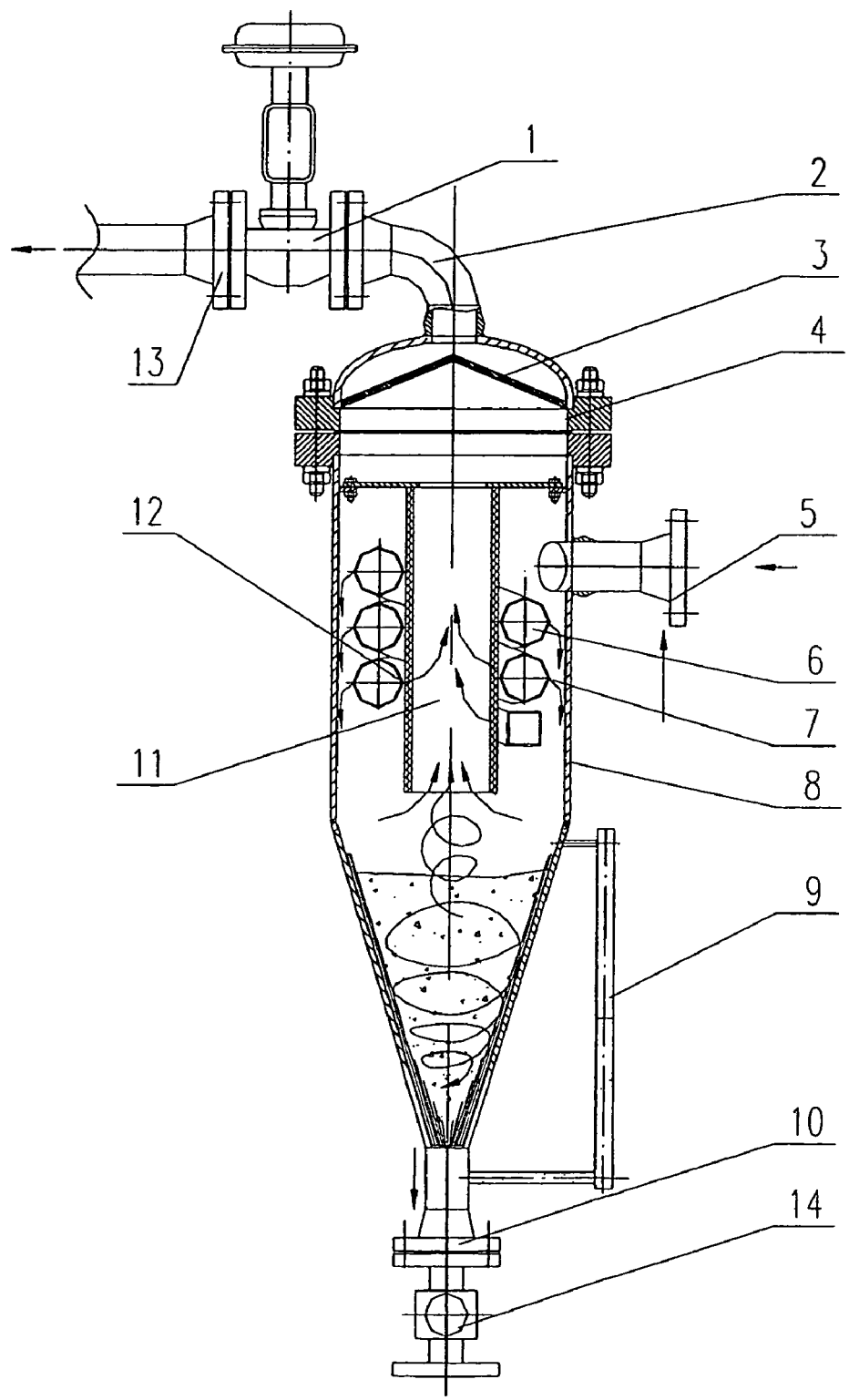
FIG. 1 is a schematic diagram of an embodiment of an adjustable type guide vortex gas-liquid separating apparatus of the invention.

FIG. 1 shows an embodiment of an adjustable type guide vortex gas-liquid separating apparatus of the invention.

A reference number 1 represents an adjusting valve; 2 represents a flange cover gas circuit exit pipe section; 3 represents a mist eliminator; 4 represents a flange cover; 5 represents an inlet flange pipe section; 6 represents a vortex flow guide spiral pipe, the pitch and the geometrical section shape of which are not limited; 7 represents liquid discharge holes, but it is not limited that the holes are open or not; 8 represents a case; 9 represents a level meter; 10 represents a liquid circuit exit connection flange; 11 represents a gas through flow pipe; 12 represents gas discharge holes, but it is not limited that the holes are open or not; 13 represents a gas circuit connection flange; and 14 represents a γ ray phase volume fraction meter.

The adjustable type guide vortex gas-liquid separating apparatus is constituted as follows:

To the gas circuit is mounted the adjusting valve, the exit end of which is connected with a gas circuit measuring pipe line through the gas circuit connection flange 13, and the inlet end of which is connected with the flange cover gas circuit exit pipe section 2, which is mounted to the top of the flange cover 4. The mist eliminator 3 is mounted inside the flange cover 4, the vortex flow guide spiral pipe 6 is mounted inside the case 8 and is connected with the inlet flange pipe section 5, the gas throughflow pipe 11 is mounted in the middle of the vortex flow guide spiral pipe 6, the level meter 9 is mounted to the cone portion of the case 8, and the γ ray phase volume fraction meter 14 is connected with the liquid circuit exit connection flange 10. The control information processing and transmitting system is not shown in the drawing.

The process is as follows: the oil-gas-water multi-phase flow enters into the vortex flow guide spiral pipe 6 from the inlet flange pipe section 5 to run a circumferential spiral movement; due to the action of centrifugal force, the liquid is separated gradually to reach the outer layer of the spiral pipe, a part of separated liquid is successively discharged from the outside liquid discharge holes 7, and the separated gas is successively discharged from the inside gas discharge holes 12 of the spiral pipe. The un-separated oil-gas-water multiphase flow is discharged from the discharge exit of the spiral pipe to run a natural vortex along the barrel wall and the cone body, and is again separated, the separated gas moves up in spiral flow and is discharged into the gas circuit from the gas throughflow pipe 11, and the mistlike liquid entrained in the gas is removed when passing through the mist eliminator 3, this gas enters into the gas circuit pipe via the adjusting valve, the liquid removed by the mist eliminator is collected into the separated oil-gas-water multi-phase flow, and the separated oil-gas-water multi-phase flow having gas content in a certain range, via the liquid circuit exit connection flange 10 and the γ ray phase volume fraction meter 14, enters into an oil-gas-water multi-phase flow rate measuring system for measuring the flow rate.

The level meter 9 measures the level in the case or the γ ray phase volume fraction meter 14 measures the gas content in the liquid circuit and provides the control information, which is sent to the adjusting valve by the information processing and transmitting system to control the opening of the adjusting valve 1 for increasing or reducing the gas content of the multi-phase flow in the liquid circuit.

The apparatus can be directly mounted to an oil line to realize the adjustment of the flow pattern of the multiphase flow, to simplify and unify the complex flow patterns becoming a relative stable flow pattern, and at the same time to locally lower the gas content of the oil-gas-water multi-phase flow. The adjustable type guide vortex gas-liquid separating apparatus can be used as a supplementary means for measuring the multiphase flow in oil field, to expand the measurement range of the multi-phase flow rate measuring apparatus and improve its adaptability.

Figure 2:
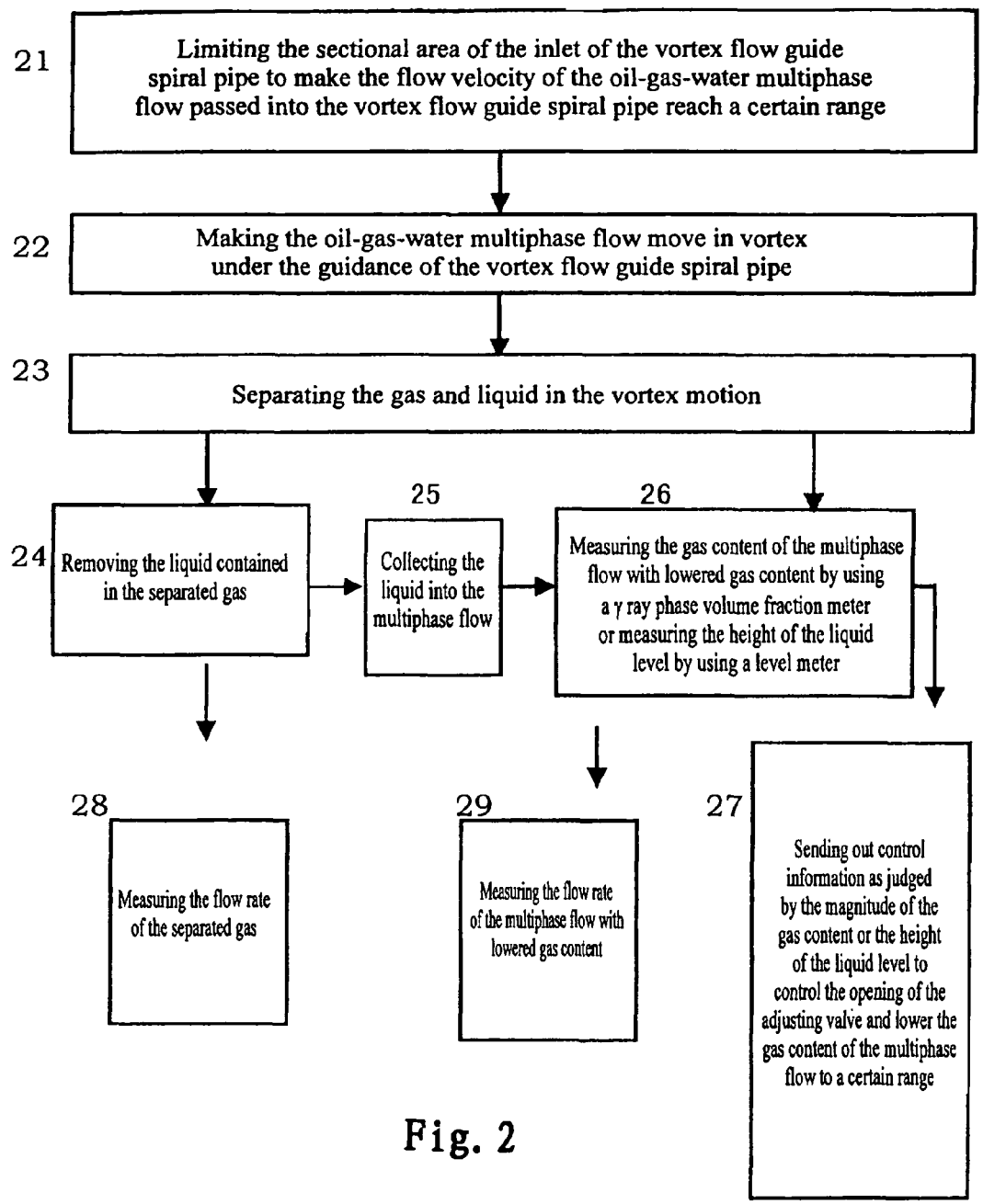
FIG. 2 is a main flowchart of a guide vortex gas-liquid separating method of the invention.

FIG. 2 is a main flowchart of a method of the invention for simplifying and unifying the flow patterns and states of the complex and varied oil-gas-water multiphase flow and for lowering the gas content.

The method comprises the following steps:

21. Limiting the sectional area of the inlet of the vortex flow guide spiral pipe to make the flow velocity of the oil-gas-water multi-phase flow passed into the vortex flow guide spiral pipe reach a certain range;

22. Making the oil-gas-water multi-phase flow move in vortex under the guidance of the vortex flow guide spiral pipe;

23. Separating the gas and liquid in the vortex motion;

24. Removing the liquid contained in the separated gas;

25. Collecting the liquid further separated from the gas into the multi-phase flow with a lowered gas content;

26. Measuring the gas content of the multi-phase flow with lowered gas content by using the γ ray phase volume fraction meter; and 27. Sending out control information as judged by the magnitude of the gas content or the height of the liquid level to control the opening of the adjusting valve and lower the gas content of the multiphase flow to a certain range.

It should be noted that, the solutions that the γ ray phase volume fraction meter is used to measure the gas content and the level meter is used to measure the height of the liquid level for sending out control information are only intended to be illustrative and not to limit the invention, and other means can be adopted, for example, a gas density meter, a hygrometer and the like are arranged in the gas circuit to provide the adjusting information for controlling the adjusting system to realize the control objects of the gas content.

By testing, the above-mentioned apparatus and method can realize an adjustment and control range of 0-60% for the gas volume.

28 and 29 shown in FIG. 2 are the flowcharts of measurement processes of the separated gas and multiphase flow rate in order to illustrate how the method of the invention to adapt for the multiphase flow rate measurement, and thereby their processes will not be described.

The invention claimed is:

1. An adjustable guide vortex gas-liquid separating apparatus comprising:
   a case;
   a gas throughflow pipe mounted in the center of the case; and
   a vortex flow guide spiral pipe mounted in the case around the gas throughflow pipe;

wherein the vortex flow guide spiral pipe is connected with an inlet flange pipe section to allow an oil-gas-water multi-phase flow to enter into the vortex flow guide spiral pipe from the inlet flange pipe section;

the vortex flow guide spiral pipe being configured to make the oil-gas-water multi-phase flow move in vortex to realize a gas-liquid separation, thereby forming a gas circuit and a liquid circuit;

wherein the apparatus further comprises an adjusting valve mounted at an exit of the gas circuit, a measuring means for obtaining control information for the adjusting valve of the gas circuit, and a mist eliminator mounted inside a flange cover of the case; and a control information processing and transmitting system configured to control the opening of the adjusting valve based at least in part on the control information and thereby lower the gas content of the oil-gas-water multiphase flow to a certain range.

2. The apparatus according to claim 1, wherein the measuring means comprises a γ ray phase volume fraction meter mounted in the liquid circuit configured to measure the lowered gas content in the liquid circuit.

3. An adjustable type guide vortex gas-liquid separating method, comprising the following steps:

limiting the sectional area of an inlet of a vortex flow guide spiral pipe to make the flow velocity of an oil-gas-water multi-phase flow passed into the vortex flow guide spiral pipe reach a certain range;

making the oil-gas-water multi-phase flow move in vortex under the guidance of the vortex flow guide spiral pipe;

separating the gas and liquid in the vortex motion;

removing the liquid contained in the separated gas by a mist eliminator and discharging the gas from the gas circuit;

collecting the liquid further separated from the gas into the multi-phase flow with a lowered gas content;

measuring the gas content of the multi-phase flow with lowered gas content by using a γ ray phase volume fraction meter or measuring the height of the liquid level by using a level meter; and sending out control information as judged by the magnitude of the gas content or the height of the liquid level to control the opening of an adjusting valve at the exit of a gas circuit to lower the gas content of the multi-phase flow to a certain range.

4. The apparatus according to claim 1, wherein said measuring means comprises a level meter mounted in the lower end of the case configured to measure a height of the liquid level.

5. The apparatus according to claim 1, wherein said measuring means comprises a γ ray phase volume fraction meter for measuring lowered gas content in the liquid circuit and a level meter configured to measure a height of the liquid level in the case, said γ ray phase volume fraction meter is mounted in the liquid circuit and said level meter is mounted in the lower end of the case.

6. The apparatus according to claim 1, wherein said measuring means comprises a gas density meter mounted in the gas circuit for measuring the density of the gas in the gas circuit.

7. The apparatus according to claim 1 wherein, said measuring means comprises a gas hygrometer mounted in the gas circuit for measuring humidity of the gas in the gas circuit.

8. The apparatus according to claim 1, wherein the vortex flow guide spiral pipe comprises a gas or liquid discharge holes opened on the inner and outer walls of the vortex flow guide spiral pipe.

* * * * *